CONTROL APPARATUS

Filed Jan. 29, 1968

INVENTOR.
JAMES A. LAGOE
BY Bruce C. Lutz
ATTORNEY

Jan. 14, 1969 J. A. LAGOE 3,422,397

CONTROL APPARATUS

Filed Jan. 29, 1968 Sheet 2 of 2

INVENTOR.
JAMES A. LAGOE
BY Bruce C Lutz
ATTORNEY

United States Patent Office 3,422,397

Patented Jan. 14, 1969

3,422,397

CONTROL APPARATUS

James A. Lagoe, Woodinville, Wash., assignor to Honeywell Inc., Minneapolis, Minn., a corporation of Delaware Filed Jan. 29, 1968, Ser. No. 701,372

U.S. Cl. 340—5 5 Claims

Int. Cl. H04b 13/00

ABSTRACT OF THE DISCLOSURE

An underwater communication system utilizing space and frequency diversity along with coded signals to increase reliability between a control station and a plurality of remotely controlled stations. The control station and each controlled station are provided with ultrasonic transceivers. The transmitting units in the transceivers operate at two different frequencies to obtain said frequency diversity, and each receiving unit is provided with spaced transducers to obtain space diversity.

*The invention*

The present invention is related generally to electronics and more specifically to an electronic system for use in sonar communications.

While both space and frequency diversity have been used separately in radio communications in the prior art, radio communications do not have as severe a problem from multipath and miscellaneous interference due to the environment as occurs in sonar signal transmission underwater. When controlling a plurality of remote underwater stations from a single point, it is necessary that there be a high amount of reliability in communication. This is accomplished in the present invention by utilizing both space and frequency diversity wherein the transmitted signal is supplied at two different frequencies and wherein the receiving circuit has space separated antenna so that the signals of both frequencies can be received at each antenna. By using diversity combining techniques a most probably correct output may be obtained indicative of the commands received. However, this reliability is even further increased due to the fact that an alert tone is transmitted which is unique to a particular remote station. This alert tone is used to activate a power supply to the remaining circuitry. Without reception of the alert tone at least one of the antennas, the apparatus will not function. Further reliability is incorporated in the apparatus by the use of a hamming distance of greater than one between signalling codes utilized in determining what function to control in the remote apparatus. Thus, even though the diversity combining is used, if the errors are few, an erroneous output will not occur. Rather, the remote apparatus will merely do nothing. After each control operation, a return signal is transmitted at two different frequencies indicating the new position or value of the controlled function and is received by two separate antennas at the control station.

It is therefore an object of this invention to provide improved underwater communication.

Other objects and advantages of the present invention over the prior art may be apparent from a reading of the specification and appended claims in conjunction with the drawing wherein:

Figure 1:
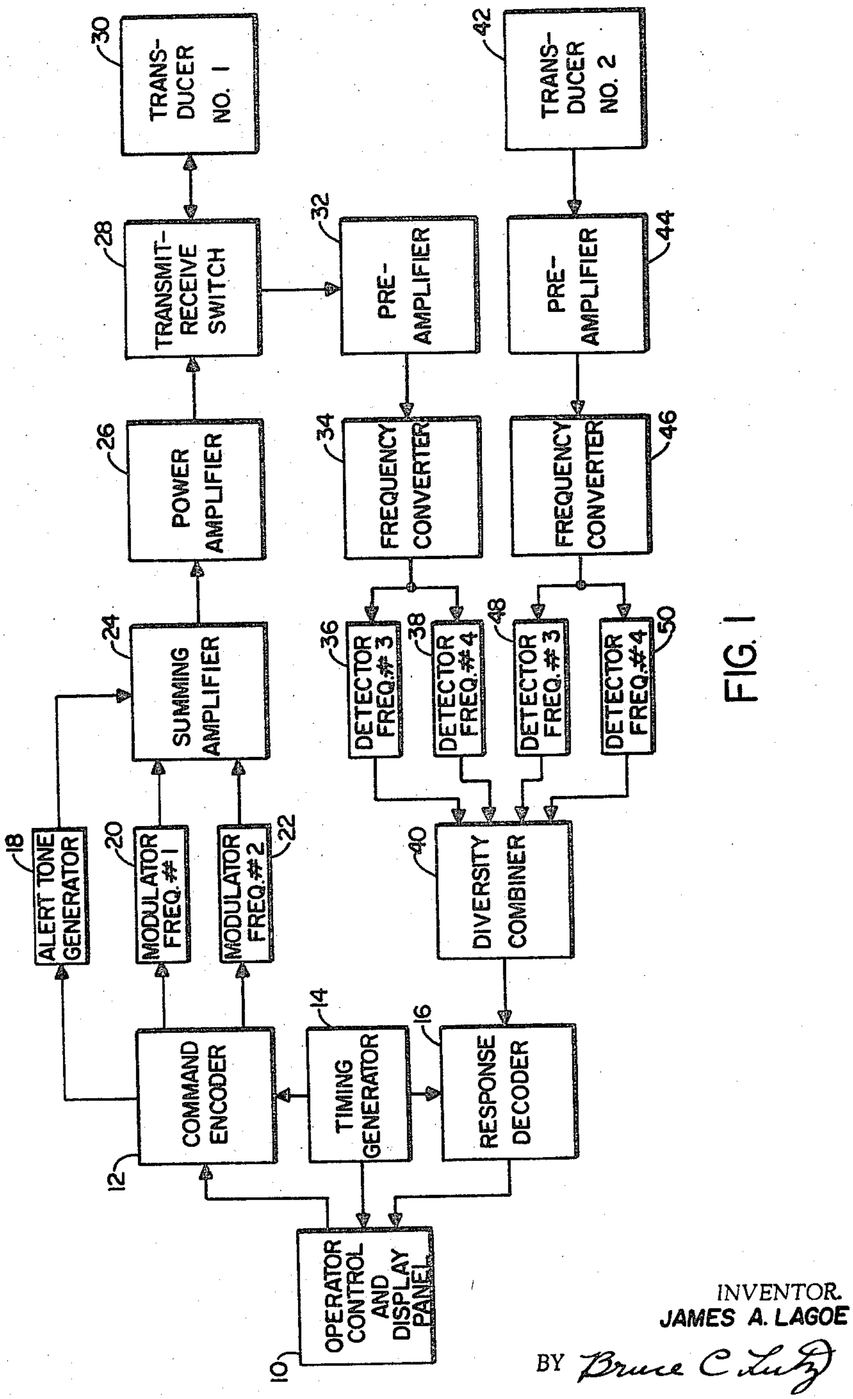
FIGURE 1 is a block diagram of the control station system.

In FIGURE 1 an operator control and display panel 10 provides an output to a command encoder 12 and receives inputs from a timing generator 14 and a response decoder 16. The timing generator 14 also supplies timing signals to the encoder 12 and the decoder 16. The encoder 12 supplies outputs to an alert tone generator 18, a first frequency modulator 20 and a second frequency modulator 22. Each of these blocks 18, 20 and 22 supply inputs to a summing amplifier 24 whose output is supplied through a power amplifier 26 to a transmit receive switch 28. The switch 28 in the transmit position supplies an output to a transducer while in the receive position receives an input from transducer 30 and supplies it to a preamplifier 32. Preamplifier 32 supplies an output through a frequency converter 34 to each of two different frequency detectors 36 and 38. Outputs of the detectors 36 and 38 are supplied to a diversity combiner 40 whose output is supplied to decoder 16. A second transducer 42 supplies signals through a preamplifier 44 and then through a frequency converter 46 to a pair of frequency detectors 48 and 50. The outputs of frequency detectors 48 and 50 are each supplied to the diversity combiner 40. In one embodiment of the invention frequency detectors 36 and 48 both operate at the same frequency as is the case with frequency detectors 38 and 50.

Figure 2:
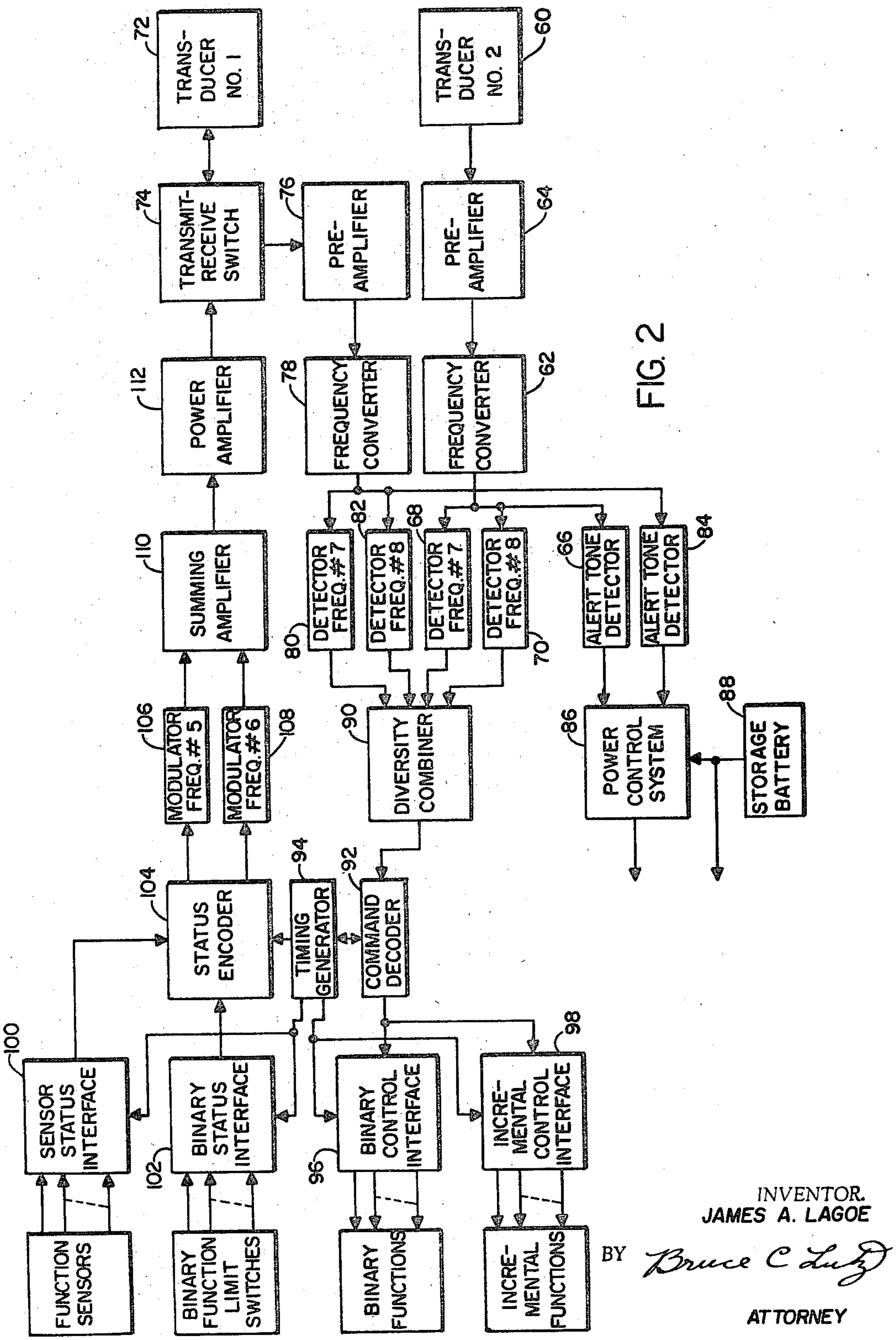
FIGURE 2 is a block diagram of a remotely controlled station.

In FIGURE 2 a first transducer or antenna means 60 supplies signals to a frequency converter 62 through a preamplifier 64. The output of converter 62 is applied to an alert tone detector 66 as well as to first and second frequency detectors 68 and 70. A second transducer or antenna means 72 supplies signals to a transmit receive switch 74 when it is in a receive position and from there through a preamplifier 76 to a frequency converter 78. An output from converter 78 is supplied to first and second frequency detectors 80 and 82 as well as to an alert tone detector 84. The outputs from detector 66 and 84 are supplied to a power control system 86 which is connected to a storage battery 88 or some other power source so as to provide an output upon reception of an alert tone from the detector 66 and 84. This power is supplied to any of the circuitry as required (connections are not shown) in the remote station beyond the converters 62 and 78. The outputs of the detectors 68, 70, 80, and 82 are all supplied to a diversity combiner 90 whose output is supplied to a command decoder 92. The decoder 92 supplies signals to timing generator 94 as well as receiving signals therefrom. The decoder 92 also supplies signals to a binary control interface 96 as well as to an incremental control interface 98. The two interface blocks convert the digital signals from decoder 92 into proper signals for a particular function to be controlled. The timing generator 94 supplies timing signals to the interfaces 96 and 98 as well as to a sensor status interface 100 and a binary status interface 102. Each of the interfaces 100 and 102 receive condition information from various functions and supply this information to a status encoder 104 which also receives timing signals from generator 94. The encoder 104 supplies output signals to each of two modulators 106 and 108 whose outputs are each applied to a summing amplifier 110. The output of summing amplifier 110 is supplied through a power amplifier 112 to the transmit receive switch 74. When the switch 74 is in a transmit position signals from power amplifier 112 are supplied to transducer 72.

The various frequency converters referenced above may be any of many types of modulators. However, one example would be that found in a book entitled Frequency Changers by Irving M. Gottlieb, published by W. Sams Co., Inc., and the Bobbs-Merrill Co., Inc., on page 103 in FIGURE 3–9. The detectors again may be of various types of one of which may be found in a book entitled Transistors in Radio and Television, by Milton S. Kiver and published by McGraw-Hill Book Co., Inc., in 1956.

An example of circuits that might be employed in these blocks are found on pages 188 and 189. The diversity combiners 40 and 90 may be any suitable type of diversity combination such as shown in an article in the proceedings of the IRE for June 1959 on pages 1075 to 1102. This article is entitled "Linear Diversity Combining Techniques" by D. G. Brennan. The rest of the blocks in the system are even more standard and within the capability of one skilled in the art and thus will not be further discussed.

In operation, a particular function to be controlled is selected by control 10. The selection may consist merely of determining the condition of some object at the remote station such as temperature or size or it may involve a binary function or change of condition such as a switch from an ON to an OFF position or it may involve an incremental function such as changing a diaphragm opening from one size to another size wherein there are many possible sizes available. The operation is set up and the control is actuated through the command encoder. First, an alert tone generator supplies a signal to the transducer 30 indicative of the particular remote station which is to be interrogated or commanded. As previously indicated each remote station has its own unique tone. Then, a short period of time thereafter, a command is supplied to each of modulators 20 and 22 wherein the command is exactly the same for both modulators. These commands may be in a binary or digital form and the outputs may be of the type termed frequency shift keyed. In other words, a "one" is of one frequency while a "zero" of a closely related but different frequency. In one embodiment of the invention while the basic frequencies of the two modulators differed by approximately 1 kHz., the one and zero frequencies of each of the modulators differed by less than 100 Hz.

Reference will now be made to FIGURE 2. Under ideal conditions, the signals transmitted from transducer 30 will be received at each of the transducers 60 and 72 and both frequencies will be received at each. Each of the signals will be applied through the appropriate preamplifiers 64 and 76 and the frequency converters 62 and 78 to the various detectors 68, 70, 80, and 82. However, if the alert tone had not been received by either one of the transducers 60 and 72, the alert tone detectors 66 and 84 would not have supplied the signal to the control system 86 to power the remaining circuitry. Thus, the signals would go no further. However, it will be assumed that the alert tone signal was received by at least one of the detectors 66 and 84 so that the remaining control circuitry is powered. Under these conditions the diversity combiner 90 either picks the best of the received signals or uses some other method of selection to determine which signal is probably correct so as to supply an output to decoder 92.

As will be realized from previous comments in this specification, environmental and multipath conditions underwater cannot be accurately predicted. While a transmitted signal of one frequency may be completely blocked from both of the transducers 60 and 72, a different frequency may reach one or both of the transducers. Further, even though there is only water between the transmitter and each of the transducers, the environment may be such that only one of the transducers receives a signal. Further, many other obstacles such as schools of fish, etc., may serve to interfere with reception of a signal by one transducer. Thus, while in most instances all four signals will be received there will also be some instances where only a single signal is received. Where only one signal is received, the diversity combiner 90 will have no problem in selecting the best signal. However, there may be instances where a signal is received and it is only marginal so that the diversity combiner must examine the various signals to determine which is the most probably correct signal.

It should also be noted that the blocking of signals is also obtained by cancellation due to multiple paths of the signal coming from different directions. This will cause a signal to fade in and out over a period of time. To obtain a best operation of the system, the transducers 60 and 70 will be spaced by several wave lengths at the operating frequency.

In addition to the diversity, the command signal which is transmitted contains redundancy. As was previously mentioned, an alert tone is first used which is unique to a particular well. The coded signal then also contains a number in the code which is further unique to the well. A function word is then supplied to indicate which function is to be controlled. In one embodiment of the invention only four bits were necessary to control each of the 16 functions. However, three extra bits were used for error detection. The control commanded is also augmented by extra error detection bits. This utilizing of the extra bits to provide greater reliability is known as hamming and a description of the utilization of hamming may be found in a book by W. Wesley Petersen entitled Error Correcting Codes, published in 1962 on pages 7 and 8.

This coded command signal is thus decoded in decoder 92 and the command transmitted to the appropriate function through either interface 96 or 98. Interface 96 is used to interface with binary commands such as switches while block 98 is used to interface with variable control functions. The decoder 92 then supplies an output signal to the timing generator 94 to start the sensing function after the command has been supplied to that function. The sensed signal is then supplied to the two modulators 106 and 108. This signal is supplied to each of the modulators as two different frequency signals the spacing between being indicative of the function sensed. This time distance may be fixed as in the case of a binary function or it may be variable as in the case of an incrementally controlled function. The signals are then transmitted back to the control station through the transducers 72 and 60.

In a manner similar to that described for reception of signals in the remote station of FIGURE 2, the control station of FIGURE 1 receives the return signals at spaced transducers 30 and 42 and applies these to the frequency detectors which again diversity combine the return signals so as to display the return information on the display panel 10. If no return signal is received after a predetermined amount of time, an error is indicated on the display panel so that the operator is notified that either the remote station did not receive the signal or that the return signal was merely missed. Thus, a check out can be made to determine what, if anything, is wrong.

In summary, therefore, the present invention utilizes frequency diversity at the transmitter and space diversity at the receiver so that the advantages of both are combined in producing the control functions and the reply. In addition, a special coded signal is utilized to provide error detection in each step of operation. This error detection is utilized in having a unique tone for each remote station as well as a station code unique to each station. Further, extra bits are utilized in each word so that the hamming distance is great enough to substantially reduce any possibility of error in reception.

While a single embodiment of the invention has been shown and described, I wish to be limited only by the scope of the appended claims wherein I claim:

1. The method of increasing reliability in underwater digital communications by providing space and frequency diversity comprising the steps of:

transmitting from a control station an actuating first signal;

transmitting from said conrol station a frequency shift keyed coded second signal after transmission of said first signal;

transmitting from said control station simultaneously with said second signal a frequency shift keyed coded third signal having a basic frequency different from the basic frequency of said second signal but having the identical code;

receiving said first signal at a remote underwater station from a plurality of transducers;

supplying control power upon reception of said first signal from at least one of said plurality of transducers;

receiving said second and third signals at each of said plurality of transducers;

diversity combining said second and third received signals to provide a single coded output fourth signal;

providing a control function indicative of the code of said fourth signal;

transmitting from said remote underwater station a pair of pulses of different frequencies wherein the spacing between pulses is indicative of the condition of the preceding controlled function;

receiving the pair of pulses at said control station from a plurality of transducers; and diversity combining the received pairs of pulses to provide an output indicative of the condition of a controlled function.

2. The method of claim 1 as applied to a plurality of remote underwater station each having a plurality of control functions comprising the additional steps of:

transmitting said first signal at a frequency unique to a given remote station; and coding said second and third signals for said given remote station as well as coding said second and third signals for a particular control function.

3. Communication apparatus for providing reliable underwater control at a station remote from a control station utilizing diversity techniques comprising in combination:

control station transmitting means including, means for transmitting an alert first signal, means for transmitting a coded second signal at a given frequency, and means for supplying said coded signal at a frequency different from said given frequency;

remote station receiving means including, a plurality of receiving transducers, a first plurality of first signal detection means connected respectively to each of said plurality of receiving transducers for actuating power supply means to said remote station upon reception of said first signal, a second plurality of coded signal detection means connected to each of said plurality of receiving transducers, first diversity combining means connected to each of said coded signal detection means for providing a single coded output signal indicative of the signals received from said second plurality of detection means, decoding means connected to receive the output signal from said diversity combiner means and for providing an output indicative of a particular control function as indicated by the received signal, and a plurality of controls each connected to said decoder and each responsive to an individual control signal from said decoder means;

remote station condition responsive transmitting means including, sensing means responsive to sense the condition of the control most recently actuated for providing an output indicative of that condition, encoder means connected to said sensing means for supplying first and second output pulses separated in time in accordance with the sensed condition, and transmitting means for transmitting from said remote station pulses of first and second frequencies having a time relation corresponding to the pulses supplied by said encoder means; and control station receiving means including, a plurality of receiving transducer means for receiving the condition responsive signals transmitted by remote stations, a third plurality of detection means connected to each of said receiving transducer means wherein each of said detection means of said third plurality is responsive to a different frequency and wherein each detection means of said third plurality provides an output indicative of signals received at its operational frequency, second diversity combining means connected to each of said third plurality of detection means for receiving signals therefrom and providing a single output signal indicative of the condition sensed; and display means connected to said diversity combining means for providing an output indicative of the sensed condition.

4. Apparatus as claimed in claim 3 wherein said remote station receiving means comprises at least two separated units each responsive to different frequency alert signals:

said control station transmits alert signals unique to a particular remote station; and said remote stations each contain binary and incremental functions among said plurality of controls.

5. Apparatus for providing increased reliability in communications between a control station and remote underwater controlled stations utilizing diversity techniques comprising, in combination:

a plurality of remote underwater stations;

command transmitting means for transmitting from the control station an alert sonar signal unique to a given remote station of said plurality of stations followed by coded sonar signals containing a code unique to said given remote station;

alert tone detection means, situated at each of said remote stations, for supplying power to other circuitry at the station upon reception of the alert signal unique to that station;

a plurality of first receiving means, situated at each of said remote stations, for receiving said coded signals after being actuated by said alert tone detection means and combining received coded signals to provide a control output signal if a first portion of the code corresponds to the station code;

a plurality of controlled means situated at each of said remote stations each responsive to said control output signal as directed thereto by said first receiving means according to a further portion of the code;

remote station transmitting means for transmitting a pair of spaced pulses of different sonar frequencies wherein the space between the pair of pulses is indicative of the condition of the most recently actuated control means;

a plurality of second receiving means for receiving said spaced pulses at the control station; and diversity combining means connected for receiving signals from said second receiving means and for providing an output indicative of the condition of the last controlled control means.

References Cited

UNITED STATES PATENTS

| | | | |
|---|---|---|---|
| 3,199,070 | 8/1965 | Baier | 340—5 |
| 3,336,571 | 8/1967 | Johnson et al. | 340—5 |

RICHARD A. FARLEY, *Primary Examiner.*

U.S. Cl. X.R.

340—151